(12) United States Patent
Al-Yami

(10) Patent No.: US 7,732,379 B2
(45) Date of Patent: Jun. 8, 2010

(54) NON-DAMAGING MANGANESE TETROXIDE WATER-BASED DRILLING FLUIDS

(75) Inventor: Abdullah Saleh Hussain Al-Bahri Al-Yami, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 12/590,795

(22) Filed: Nov. 12, 2009

(65) Prior Publication Data

US 2010/0069267 A1   Mar. 18, 2010

Related U.S. Application Data

(62) Division of application No. 11/402,088, filed on Apr. 10, 2006, now Pat. No. 7,618,924.

(51) Int. Cl.
*C09K 8/03* (2006.01)
*C09K 8/18* (2006.01)

(52) U.S. Cl. .............. 507/110; 166/305.1; 175/65; 507/140; 507/209; 507/271

(58) Field of Classification Search .............. 507/110, 507/140, 209, 271; 166/305.1; 175/65
See application file for complete search history.

(56) References Cited

U.S. PATENT DOCUMENTS 7,618,924 B2 * 11/2009 Al-Yami ............... 507/110
2004/0209781 A1 * 10/2004 Harris ................... 507/200

OTHER PUBLICATIONS

Ovind Svendsen et al., Use of a Novel Drill-In/Completion Fluid Based on Potassium Formate Brine on the First Open Hole Completion in the Guilfaks Field, SPE/IADC 29409, 1995.*
D.J. Oakley et al., Innovative Drilling Fluid Design and Rigorous Pre-Well Planning Enable Success in an Extreme HTHP Well, IADC/SPE 62729, 2000.*

* cited by examiner

*Primary Examiner*—Timothy J. Kugel
(74) *Attorney, Agent, or Firm*—Abelman, Frayne & Schwab

(57) ABSTRACT

A water-based drilling fluid containing $Mn_3O_4$ has been found to be effective in providing petroleum reservoirs with the ability to flow naturally and achieve a return permeability of 90% or greater without the need for acidizing treatments.

4 Claims, 3 Drawing Sheets

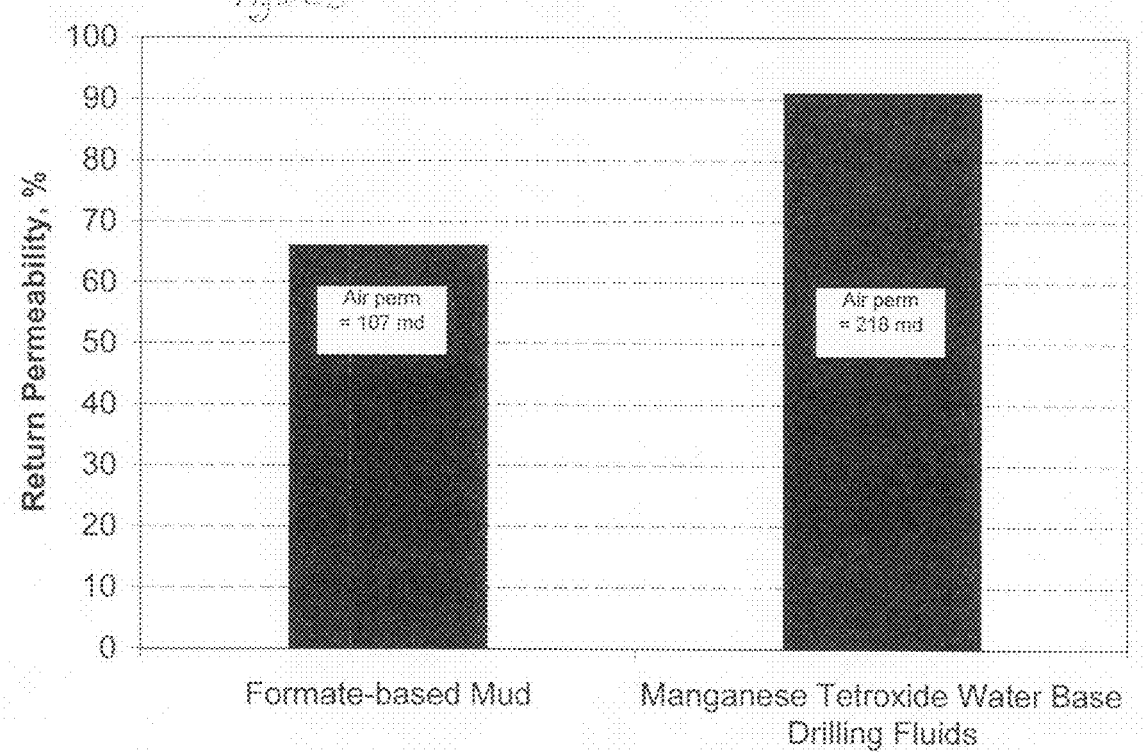

NON-DAMAGING MANGANESE TETROXIDE WATER-BASED DRILLING FLUIDS

This application is a divisional application of application Ser. No. 11/402,088, filed Apr. 10, 2006, now U.S. Pat. No. 7,618,924.

FIELD OF THE INVENTION

The present invention relates to a drilling fluid containing manganese tetroxide. More particularly, the invention relates to a water-based, manganese tetroxide-containing drilling fluid composition which generates high return permeabilities without the need for reservoir stimulation and to a process for its utilization.

BACKGROUND OF THE INVENTION

The rotary drilling of a wellbore is accomplished by rotating a drill string having a drill pipe and a drill bit at its lower end. Weight is applied to the drill bit while it is rotating to create a borehole into the earth. The drill string is hollow and sections are added to the drill string to increase its length as the borehole is deepened. This rotary drilling process creates significant amounts of friction which produces heat along with fragments of the strata being penetrated. The fragments of the strata must be removed from the borehole and the drill bit must be cooled to extend its useful life. Both of these functions are accomplished by circulating a fluid down through the drill string and up to the surface between the drill string and the wall of the borehole. Generally, the borehole into which the casing or liner is introduced is filled with drilling mud.

While the use of manganese tetroxide ($Mn_3O_4$) in drilling fluid formulations is known, the use of such $Mn_3O_4$-containing formulations has generally been found to be damaging to the reservoir formation. Generally speaking, the permeability of reservoirs is reduced when they are contacted with drilling fluids and, as a result, the development of special and expensive stimulation techniques has proven necessary.

In horizontal wells, long-reached wells, and in maximum reservoir wells, the stimulation techniques which effectively remove material to restore permeability to the damaged reservoir are not possible since the fluid stimulation acids only contact one side of the reservoir formation due to the effects of gravity. Thus, all of the sides of the wellbore would not be contacted.

The use of cool coil tubing stimulation is also a problem because the tubing cannot reach the bottom of deep horizontal wells.

The March 2000 issue of SPE Drill & Completion, Volume 15, No. 1, reported on the use of manganese tetroxide with other additives in various formulations which proved to have negative effects on reservoir performance.

In SPE Publication No. 29409 (1995), a manganese tetroxide formulation is disclosed which requires a special stimulation method and, thus, is not suitable for all types of wells.

In SPE Publication No. 62729 (2000), a manganese tetroxide-containing formulation is presented in Table 4 which proved damaging to the reservoir. Also in the same paper at page 5, manganese tetroxide is employed with hematite and increases the formulation's density and improves its suspension. However, once again, special stimulation methods are needed in order to provide partial restoration of the permeability of the hydrocarbons to flow.

Also in SPE Publication No. 87127 (March 2004), tables 2 and 3 set forth two separate formulations wherein manganese tetroxide was employed along with other additives. Both of these formulations produced negative effects, which required subsequent stimulation.

It is an object of the present invention to provide a drilling fluid formulation containing manganese tetroxide wherein the reduction in the permeability of the reservoir formation to the flow of hydrocarbons is minimized.

Another object of the present invention is to provide a manganese tetroxide-based drilling fluid for use in wells which are difficult to stimulate.

It is still a further object of the present invention to provide a manganese tetroxide based wellbore drilling fluid which can be used effectively in horizontal wells, long-reached wells, and maximum reservoir wells, and which can provide hydrocarbon flows greater than 90% without requiring acid stimulation.

It is still a further object of the present invention to provide water-based manganese tetroxide drilling fluids that are useful over a wide pressure range, with good suspension and good solids content, and are 100% soluble in HCl.

SUMMARY OF THE INVENTION

The present invention provides a manganese tetroxide-containing wellbore drilling fluid formulation which generates about 90% or greater return permeability, without the need for acidizing washes after the completion of drilling to stimulate the hydrocarbon reservoir. The formulation, which is water-based, possesses all of the necessary physical properties, such as appropriate rheology and fluid loss prevention, to effectively drill reservoir sections while also having the ability to form a filter cake which is easily removed simply by the natural flow of the hydrocarbons from the formation.

Those skilled in the art will recognize the above-mentioned advantages and features of the invention together with other aspects thereof upon reading the following detailed description in conjunction with the attached drawing sheets.

BRIEF DESCRIPTION OF THE DRAWINGS

FIG. 3 is a bar graph plotting return permeability for formate-based mud versus manganese tetroxide water-based drilling fluids in accordance with the present invention.

DETAILED DESCRIPTION OF THE INVENTION

Figure 1:
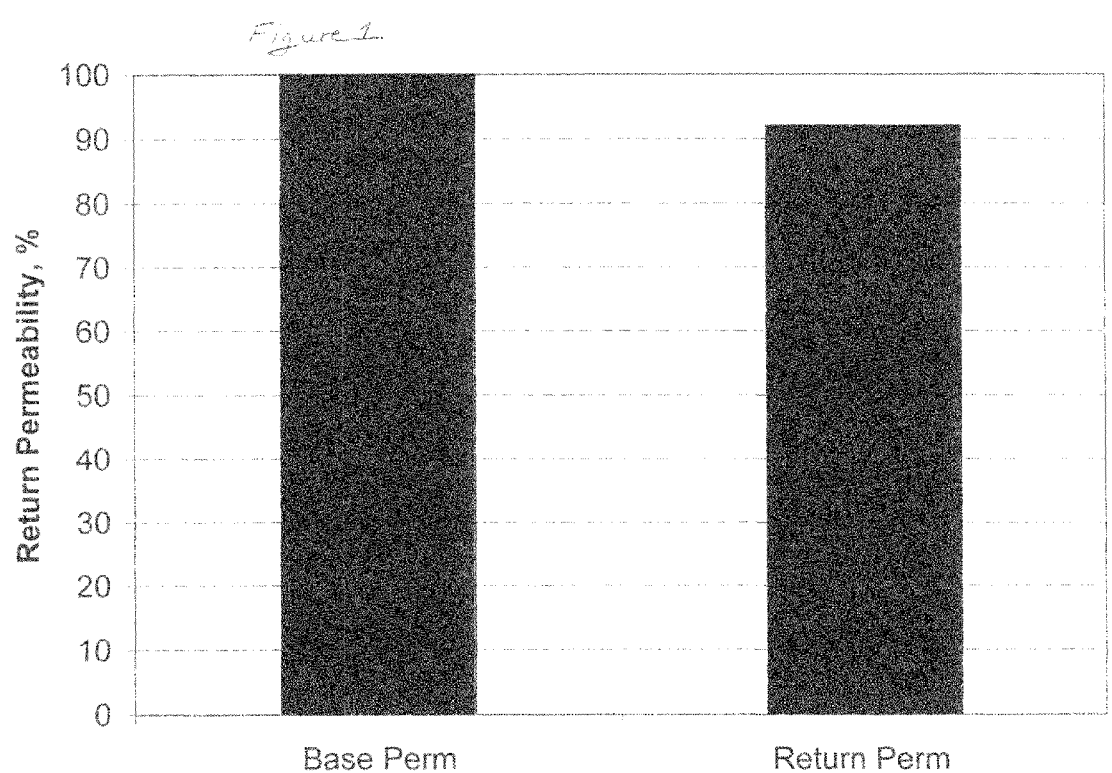
FIG. 1 is a bar graph plotting base permeability versus return permeability (%) in accordance with the present invention with no acid wash.

The drilling fluid formulation of the present invention comprises $Mn_3O_4$, water, and a member selected from the group consisting of water-soluble clays, water-soluble polymers, and mixtures thereof. The $Mn_3O_4$ in the formulation of the present invention acts as a layer to bridge the reservoir ("bridging agent") while the clays and/or polymers act as viscosifiers, filtration reducers and shale control agents. Exemplary of the clays which can be employed to advantage are bentonite and attapulgite. Exemplary of the polymers which are useful in the formulation and process of the present invention are dry xanthan biopolymer, regular polyanionic cellulose and synthetic water-soluble copolymers. Optionally, the formulation can also include an alkali metal salt to provide a mechanism for adjusting the density of the drilling composition.

In order to achieve the desired performance levels, namely, a 90% or greater return permeability, the formulation of the present invention must possess certain rheological, density, temperature, and fluid loss properties that are within specified ranges.

In order to achieve adequate suspension of the $Mn_3O_4$ in the drilling mud of the present invention, it has been found preferable that the density be in the range of about 65 to about 190 pcf, with a density of 65 pcf to 100 pcf being preferred. As discussed above, the density can be adjusted by the optional inclusion of salts, such as calcium chloride, sodium chloride, and potassium chloride.

$Mn_3O_4$-based drilling mud formulations of varying densities can be readily prepared due to their small particle size, regular spherical shape, high specific gravity and the significant suspending ability of the $Mn_3O_4$. The average particle size of $Mn_3O_4$ is about 5 microns, and its specific gravity is from about 4.90 to about 4.97. Water-based drilling fluids which employ manganese tetroxide form a filter cake which can be easily removed from reservoir pores and will exit the reservoir along with the natural flow of the well thus increasing reservoir production. Ready removal of the filter cake cannot be accomplished by the use of conventional weighting materials, such as calcium carbonate, barite and hematite, the particles of which are larger and irregularly shaped and become entrained in the pores of the reservoir rock.

The invention will be further illustrated by the following examples, which are representative only and should not be construed as limiting the present invention.

EXAMPLE 1

A $Mn_3O_4$ water-based drilling mud was prepared in accordance with the composition of the present invention. Included were the materials in the amounts indicated below.

| | |
|---|---|
| Water (fresh) | 0.952 lbs/bbl (95.2%) |
| Bentonite | 4.0 lbs/bbl |
| XC-polymer[1] | 1.5 lbs/bbl |
| Dextride[2] | 6.0 lbs/bbl |
| Lime[3] | 0.25 lbs/bbl |
| $Mn_3O_4$ | 80.0 lbs/bbl |

[1]XC-polymer: dry xanthan biopolymer
[2]Dextride: modified starch with biocide
[3]Lime: hydrated lime The drilling mud of this example was tested pursuant to API-13B to determine its density, rheology and fluid loss. The results are indicated below.

| | | |
|---|---|---|
| a) Density | | 74 pcf |
| b) Rheology readings | | |
| | 600 rpm | 76 |
| | 300 rpm | 58 |
| | 200 rpm | 50 |
| | 100 rpm | 39 |
| | 6 rpm | 17 |
| | 3 rpm | 14 |
| | Gels 10 sec/10 min. | 15/22 |
| | PV (Plastic viscosity) | 18 |
| | YP (Yield viscosity) | 40 |
| c) Fluid loss test - 5.6 ml of clear liquid filtrate was observed. | | |
| d) Solubility Test - The dry $Mn_3O_4$ was observed to be 100% soluble in 15% HCl. | | |

Also, the filter cake, having a density of 74 pcf, was found to be 100% soluble in 15% HCl.

EXAMPLE 2

In this example, the same drilling mud formulation employed as in Example 1 was used, except that bentonite was not included. It was tested pursuant to test API-13B.

| | |
|---|---|
| Fresh water | 0.952 lbs/bbl (95.2%) |
| XC-polymer[1] | 1.5 lbs/bbl |
| Dextride[2] | 6 lbs/bbl |
| Lime[3] | 0.25 lbs/bbl |
| $Mn_3O_4$ | 80 lbs/bbl |

Density = 74 pcf

Rheology readings:

| | |
|---|---|
| 600 rpm | 51 |
| 300 rpm | 38 |
| 200 rpm | 32 |
| 100 rpm | 23 |
| 6 rpm | 7 |
| 3 rpm | 5 |
| Gels 10 sec/10 min | 7/16 |
| P.V. | 13 |
| Y.P. | 25 |

Fluid Loss Test—6.2 ml of red filtrate was observed.

EXAMPLE 3

The materials and the amounts added are the same as in Example 1, except the amount of bentonite was 2 lbs/bbl. It was tested pursuant to API 13B.

| | |
|---|---|
| Fresh water | 0.952 bbl (95.2%) |
| Bentonite | 2 lbs/bbl |
| XC-polymer[1] | 1.5 lbs/bbl |
| Dextride[2] | 6 lbs/bbl |
| Lime[3] | 0.25 lb/bbl |
| $Mn_3O_4$ | 80 lb/bbl |

Density = 74 pcf

Rheology readings:

| | |
|---|---|
| 600 rpm | 62 |
| 300 rpm | 46 |
| 200 rpm | 40 |
| 100 rpm | 31 |
| 6 rpm | 11 |
| 3 rpm | 9 |
| Gels 10 sec/10 min. | 11/14 |
| P.V. | 16 |
| Y.P. | 30 |

Fluid Loss Test—5.4 ml of pink filtrate was observed.

EXAMPLE 4

In this comparative example, a conventional drilling fluid employing $CaCO_3$ as the weighting agent was prepared as a control to compare with the drilling fluid of the present invention. It was tested pursuant to API 13B.

| Fresh water | 0.887 bbl (88.7%) |
| --- | --- |
| Bentonite | 4 lbs/bbl |
| XC-polymer[1] | 1.5 lbs/bbl |
| Dextride[2] | 6 lbs/bbl |
| Lime[3] | 0.25 lb/bbl |
| CaCO$_3$ | 104 lbs/bbl |

Density = 74 pcf

Rheology readings:

| 600 rpm | 78 |
| --- | --- |
| 300 rpm | 60 |
| 200 rpm | 53 |
| 100 rpm | 44 |
| 6 rpm | 26 |
| 3 rpm | 25 |
| Gels 10 sec/10 min | 21/28 |
| P.V. | 18 |
| Y.P. | 40 |

Fluid Loss Test: —4.2 ml of clear filtrate was observed.
Solubility test: —98-100 solubility It can be seen that by the use of CaCO$_3$, which is a conventional weighting and bridging agent, 104 lbs of CaCO$_3$ was needed to achieve a density of 74 pcf. In Examples 1 and 3, a 74 pcf density was obtained using only 80 lbs. of Mn$_3$O$_4$. Thus, a formulation in accordance with the present invention will have a significantly lower solids content.

EXAMPLE 5

In this example, a drilling fluid having a density of 93 pcf was prepared for evaluation pursuant to API test 13B.

| Fresh water | 0.674 bbl (67.4%) |
| --- | --- |
| XC-polymer[1] | 1 lb/bbl |
| Pac-R[4] | 2 lb/bbl |
| Lime[3] | 0.5 lb/bbl |
| CaCl$_2$ | 235 lbs/bbl |
| Mn$_3$O$_4$ | 51 lbs/bbl |

[4]Pac-R: regular polyanionic cellulose
Density = 93 pcf

Rheology readings:

| 600 rpm | 66 |
| --- | --- |
| 300 rpm | 42 |
| 200 rpm | 33 |
| 100 rpm | 22 |
| 6 rpm | 6 |
| 3 rpm | 4 |
| Gels 10 sec/10 min | 4/10 |
| P.V. | 24 |
| Y.P. | 18 |

Fluid Loss Test—4.1 ml of clear filtrate was observed.
Solubility test—The filter cake dissolved completely and rapidly in 15% HCl. The filter cake was also soluble in the range of (3%-7%) HCl.

EXAMPLE 6

In the graph of FIG. 1, the bar labeled Base Perm represents hydrocarbon in formation. The sandstone core used to obtain the Base Perm reading was clean, and diesel oil was injected through it. The result obtained provides a reference point, which is commonly referred to as the Base Perm.

Thereafter, the same core was exposed to the drilling fluid of the present invention, namely, the manganese tetroxide water-based drilling fluid of Example 5 followed by the injection of diesel oil through the core. The measured value, referred to as Return Perm in FIG. 1, was almost 93% of the Base Perm value.

Thus, this experiment demonstrates that 93% of the initial volume of oil injected in the clean core could still be injected in the same core after it was exposed to the manganese tetroxide drilling fluid of the present invention.

EXAMPLE 7

A sandstone core plug sample from the Unayzah reservoir (Saudi Arabia) was loaded into a dynamic loop core holder to simulate circulating mud and the formation of filter cake on the sample face. Overburden pressure was applied on the sample equal to 1200 psi. The core sample was saturated with diesel oil by flowing it in the production direction with pore pressure of 500 psi. The flowing continued overnight with the total injected measuring 20 pore volume. The permeability was measured in cycles with different flow rates of 1, 2, 4, 8, 4, 2, 1 cc/min with oven temperature of 280° F. and a pore pressure of 500 psi. The flow with each flow rate was continued until a stable dP was reached. The cycle was repeated until the same dP was measured using the same flow rates.

Before measuring the return permeability several pore volumes of diesel oil were injected in the production direction to simulate the clean-out procedure employed in the field. Then the flow lines were checked for any blockages from the filter cake produced during the clean-out. Return permeability was measured using the same sequence of flow rate as was used in establishing the base permeability described above.

Figure 2:
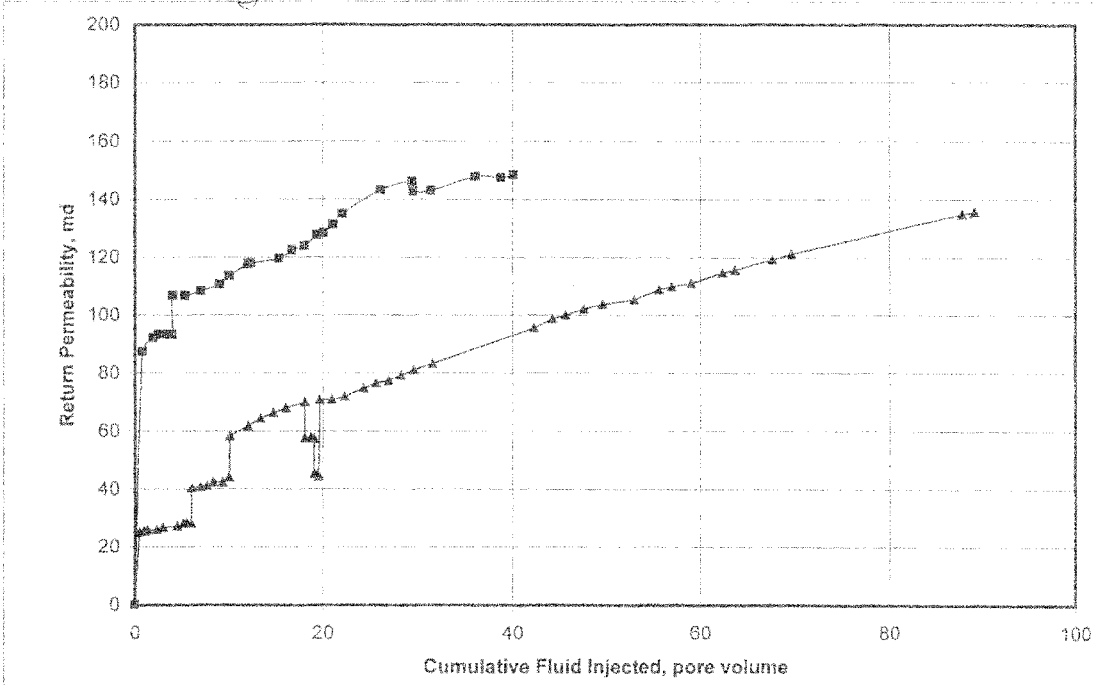
FIG. 2 is a graph plotting return permeability versus cumulative fluid injected (pore volume) in accordance with the present invention with no acid wash.

As can be seen from the graphical representation set forth in FIG. 2, the volume of oil which was injected into the core after exposing it to the manganese tetroxide formulation of Example 5 (represented by triangles in the graph) approaches the volume of oil injected in the clean core (represented by squares). This indicates that the manganese tetroxide drill-in fluid of the present invention was removed and self-cleaned simply by the flow of oil.

EXAMPLE 8

A sandstone core sample was saturated under vacuum with a synthetic formation brine for more than 2 hours. The synthetic formation brine included, fresh water, sodium formate, potassium formate, CaCO$_3$, and a xanthan biopolymer. The saturated sample was loaded into the core holder and a pressure of 1,000 psi was applied. The core holder was placed inside an oven, and the temperature was set to 280° F. Diesel oil was injected into the core and the volume of injected oil was measured.

The same manganese tetroxide drilling fluid which was used in Example 5 was filled into an accumulator. It was circulated on the core for 30 minutes. The circulation of the Mn$_3$O$_4$ drilling fluid was then stopped leaving the drilling fluid in contact with the core for 16 hours after mud circulation.

The same procedure was followed with the formate drilling fluid. Thereafter, diesel oil was injected through each of the core samples again to determine the effect of the respective drilling fluids, (Mn$_3$O$_4$ vs. formate) on the return permeability. Stated in other words, the oil is injected through each of the core samples again to determine how much volume was injected after having exposed the cores to the respective drilling fluids and then compare it with initial volume of oil on the clean core.

The general equation to be used to compare the results before and after exposing cores to drilling fluids is shown below:

$$K_R = \frac{K_d}{K_o} \times 100 \qquad (1)$$

where,
$K_R$: Return Permeability, %
$K_d$: Post Treatment Permeability, md (after exposing drilling fluids)
$K_o$: Original Permeability, md (before exposing drilling fluids).

It is clear from the bar graphs in FIG. 3 that the return permeability for the formate-based drilling fluid is only 66% of the initial volume of oil injected, while, by comparison, the return permeability of the $Mn_3O_4$ formulation of the present invention is almost 93% of the initial volume of oil injected.

Thus, the present invention is well-adapted to carry out the objects and achieve the advantages which are mentioned as well as those which are inherent. While possible variations will be apparent to those skilled in the art, such changes are encompassed within the spirit of this invention as defined in the appended claims.

What is claimed is:

1. A method of treating a wellbore in a hydrocarbon reservoir which comprises introducing into the wellbore a drilling fluid formulation including $Mn_3O_4$, potassium chloride, water and a member selected from the group consisting of a clay, a polymer, and mixtures thereof, said drilling fluid formulation having a density of about 65 pcf to about 190 pcf.; the return permeability is 90% or greater and the drilling fluid formulation does not contain formates, barite, hematite, and calcium carbonate.

2. The method of claim 1, wherein the $Mn_3O_4$ has an average particle size of about 5 microns and a specific gravity of about 4.90 to about 4.97.

3. The method of claim 1, wherein the clay is bentonite.

4. The method of claim 1, wherein the polymer is a xanthan biopolymer.

* * * * *